United States Patent
Suzuki et al.

(10) Patent No.: US 10,716,144 B2
(45) Date of Patent: Jul. 14, 2020

(54) TERMINAL APPARATUS, AND COMMUNICATION METHOD

(71) Applicants: SHARP KABUSHIKI KAISHA, Sakai, Osaka (JP); FG INNOVATION COMPANY LIMITED, Tuen Mun, New Territories (HK)

(72) Inventors: Shoichi Suzuki, Sakai (JP); Tatsushi Aiba, Sakai (JP); Wataru Ohuchi, Sakai (JP); Tomoki Yoshimura, Sakai (JP); Liqing Liu, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/095,313

(22) PCT Filed: Feb. 28, 2017

(86) PCT No.: PCT/JP2017/007851
§ 371 (c)(1),
(2) Date: Oct. 19, 2018

(87) PCT Pub. No.: WO2017/183312
PCT Pub. Date: Oct. 26, 2017

(65) Prior Publication Data
US 2019/0141743 A1 May 9, 2019

(30) Foreign Application Priority Data
Apr. 20, 2016 (JP) ................................. 2016-084269

(51) Int. Cl.
*H04W 74/08* (2009.01)
*H04W 52/50* (2009.01)
(Continued)

(52) U.S. Cl.
CPC ......... *H04W 74/0808* (2013.01); *H04J 11/00* (2013.01); *H04W 52/50* (2013.01);
(Continued)

(58) Field of Classification Search
CPC ........... H04W 74/0833; H04W 72/042; H04W 72/0413; H04W 72/0446; H04W 72/1284;
(Continued)

(56) References Cited

U.S. PATENT DOCUMENTS

2013/0201960 A1* 8/2013 Kim ...................... H04L 1/1861
370/331
2016/0094975 A1* 3/2016 Sheng ................. H04W 72/042
370/216
(Continued)

OTHER PUBLICATIONS

Author Unknown, on Channel Access Procedures for PRACH and SRS, Doc. No. R1-163153, pp. 1-3, Apr. 15, 2016 (Year: 2016).*
(Continued)

*Primary Examiner* — Christopher M Crutchfield
(74) *Attorney, Agent, or Firm* — ScienBiziP, P.C.

(57) ABSTRACT

A terminal apparatus capable of efficiently performing a random access procedure is a terminal apparatus that communicates with a base station apparatus by using multiple serving cells including a primary cell and one or multiple secondary cells, and includes a medium access control layer processing unit (15) for starting a random access procedure in any one of the multiple serving cells based on a PDCCH order, a transmitter (10) for transmitting a random access preamble in any one of the multiple serving cells, and a receiver (10) for receiving a random access response, in which the medium access control layer processing unit (15), in a case that reception of the random access response is considered not successful, determines whether to automatically resume transmission of the random access preamble or not, at least based on which of the primary cell and the secondary cell is used to transmit the random access preamble.

8 Claims, 7 Drawing Sheets

(51) Int. Cl.
*H04J 11/00* (2006.01)
*H04W 72/04* (2009.01)
*H04W 76/27* (2018.01)
*H04W 74/02* (2009.01)
*H04W 80/02* (2009.01)
*H04W 80/08* (2009.01)
*H04L 5/00* (2006.01)

(52) U.S. Cl.
CPC ......... *H04W 72/04* (2013.01); *H04W 72/042* (2013.01); *H04W 72/0446* (2013.01); *H04W 72/0473* (2013.01); *H04W 72/0493* (2013.01); *H04W 74/02* (2013.01); *H04W 74/08* (2013.01); *H04W 74/0833* (2013.01); *H04W 76/27* (2018.02); *H04W 80/02* (2013.01); *H04W 80/08* (2013.01); *H04L 5/001* (2013.01)

(58) Field of Classification Search
CPC .. H04W 72/1289; H04W 5/0053; H04L 5/001
See application file for complete search history.

(56) References Cited

U.S. PATENT DOCUMENTS

2016/0302080 A1* 10/2016 Hwang .................. H04W 4/70
2018/0124825 A1* 5/2018 Lee ....................... H04W 74/04

OTHER PUBLICATIONS

Author Unknown, Details for SRS and PRACH switching and transmission, Doc. No. R1-1609983, pp. 1-6, Oct. 14, 2016 (Year: 2016).*

Author Unknown, TS 36.321 v13.1.0, Mar. 2016 (Year: 2016).*
Author Unknown, R1-162471, Random access procedure in LAA, Apr. 15, 2016, pp. 1-5 (Year: 2016).*
Author Unknown, WF on PRACH Procedure in LAA, Doc No. R1-163785, pp. 1-3. Apr. 15, 2016 (Year: 2016).*
Ericsson Huawei, "New Work Item on enhanced LAA for LTE", 3GPP TSG RAN Meeting #70, RP-152272, Sitges, Spain, Dec. 7-10, 2015.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0 (Dec. 2015).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS 36.300 V13.2.0 (Dec. 2015).
"3rd Generation Partnership Project; Technical Specification Group Radio Access Network; Evolved Universal Terrestrial Radio Access (E-UTRA); Physical layer procedures (Release 13)", 3GPP TS 36.213 V13.1.1 (Mar. 2016).
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0 (Mar. 2016).
"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0 (Mar. 2016).
LG Electronics et al., "WF on PRACH procedure in LAA", R1-163785, 3GPP TSG RAN WG1 #84bis Busan, Korea Apr. 11-15, 2016.

* cited by examiner

TERMINAL APPARATUS, AND COMMUNICATION METHOD

TECHNICAL FIELD

An aspect of the present invention relates to a terminal apparatus and a communication method.

BACKGROUND ART

In the 3rd Generation Partnership Project (3GPP), a radio access method and a radio network for cellular mobile communications (hereinafter, referred to as "Long Term Evolution (LTE: registered trademark)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas covered by the base station apparatuses are deployed to form a cellular structure. A single base station apparatus may manage multiple cells.

In LTE release 13, career aggregation which is a technique for a terminal apparatus to perform simultaneous transmission and/or reception in multiple serving cells (component careers) has been specified (Non Patent Literature 1, 2, 3, 4, and 5). In LTE release 14, function enhancement of Licenses Assisted Access (LAA) and carrier aggregation using uplink carriers in an unlicensed band has been studied (Non Patent Literature 6). Also in Non Patent Literature 6, transmission of a Physical Random Access CHannel (PRACH) using an uplink carrier in an unlicensed band has been studied.

CITATION LIST

Non Patent Literature

NPL 1: "3GPP TS 36.211 V13.1.0 (2016-03)", 29 Mar. 2016.
NPL 2: "3GPP TS 36.212 V13.1.0 (2016-03)", 29 Mar. 2016.
NPL 3: "3GPP TS 36.213 V13.1.1 (2016-03)", 31 Mar. 2016.
NPL 4: "3GPP TS 36.300 V13.2.0 (2015-12)", 13 Jan. 2015.
NPL 5: "3GPP TS 36.321 V13.0.0 (2015-12)", 14 Jan. 2016.
NPL 6: "New Work Item on enhanced LAA for LTE", RP-152272, Ericsson, Huawei, 3GPP TSG RAN Meeting #70, Sitges, Spain, 7th-10 Dec. 2015.

SUMMARY OF INVENTION

Technical Problem

An aspect of the present invention provides a terminal apparatus capable of efficiently performing a random access procedure, a communication method to be used by the terminal apparatus, an integrated circuit to be mounted on the terminal apparatus, a base station apparatus capable of efficiently performing a random access procedure, a communication method to be used by the base station apparatus, and an integrated circuit to be mounted on the base station apparatus.

Solution to Problem (1) According to some aspects of the present invention, the following measures are provided. That is, a first aspect of the present invention is a terminal apparatus that includes a medium access control layer processing unit configured to start a random access procedure for a serving cell based on a Physical Downlink Control CHannel (PDCCH) order, a transmitter configured to transmit a random access preamble in the serving cell, and a receiver configured to receive a random access response, in which the medium access control layer processing unit, in a case that reception of the random access response is considered not successful, determines whether to automatically resume transmission of the random access preamble or not, based on a configuration of a higher layer.

(2) A second aspect of the present invention is a terminal apparatus that communicates with a base station apparatus by using multiple serving cells including a primary cell and one or multiple secondary cells, the terminal apparatus including a medium access control layer processing unit configured to start a random access procedure in any one of the multiple serving cells based on a Physical Downlink Control CHannel (PDCCH) order, a transmitter configured to transmit a random access preamble in any one of the multiple serving cells, and a receiver configured to receive a random access response, in which the medium access control layer processing unit, in a case that reception of the random access response is considered not successful, determines whether to automatically resume transmission of the random access preamble or not, at least based on which of the primary cell and the secondary cell is used to transmit the random access preamble.

(3) A third aspect of the present invention is a communication method used for a terminal apparatus, the communication method starting a random access procedure for a serving cell based on a Physical Downlink Control CHannel (PDCCH) order, transmitting a random access preamble in the serving cell, and determining whether to automatically resume transmission of the random access preamble or not, based on a configuration of a higher layer, in a case that reception of a random access response is considered not successful.

(4) A fourth aspect of the present invention is a communication method used for a terminal apparatus that communicates with a base station apparatus by using multiple serving cells including a primary cell and one or multiple secondary cells, the communication method starting a random access procedure in any one of the multiple serving cells based on a Physical Downlink Control CHannel (PDCCH) order, transmitting a random access preamble in any one of the multiple serving cells, and determining whether to automatically resume transmission of the random access preamble or not, at least based on which of the primary cell and the secondary cell is used to transmit the random access preamble, in a case that reception of a random access response is considered not successful.

Advantageous Effects of Invention

According to the present invention, a terminal apparatus can perform a random access procedure efficiently. Further, a base station apparatus can perform a random access procedure efficiently.

DESCRIPTION OF EMBODIMENTS

Embodiments of the present invention will be described below.

Figure 1:
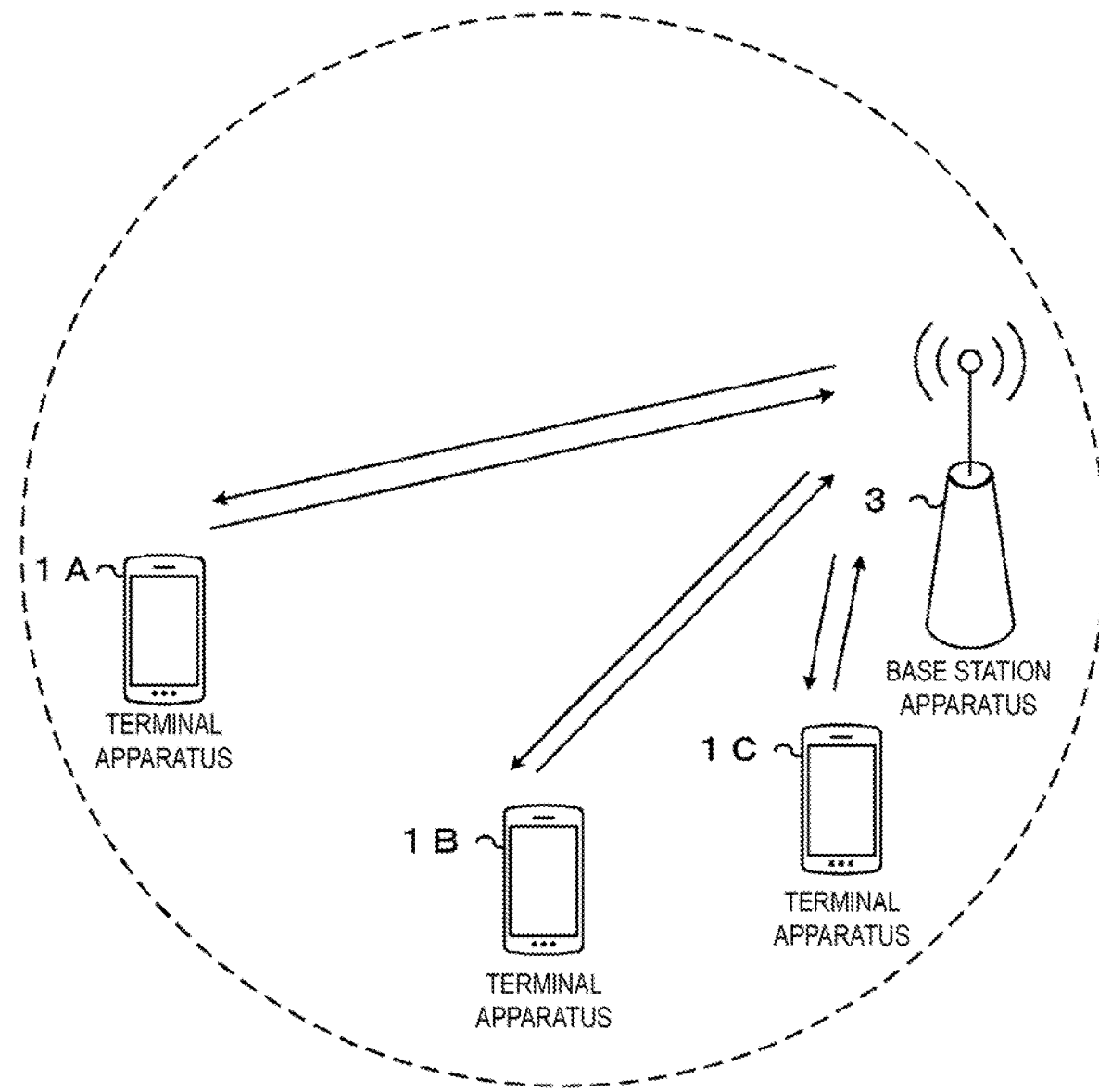
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and the base station apparatus 3. Each of the terminal apparatuses 1A to 1C is referred to as the terminal apparatus 1 below.

Now, carrier aggregation will be described.

In the present embodiment, multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. Furthermore, an aspect of the present invention may be applied to some of the configured multiple serving cells. Furthermore, an aspect of the present invention may be applied to each of groups of the configured multiple serving cells. Furthermore, an aspect of the present invention may be applied to some of the groups of the configured multiple serving cells.

The multiple serving cells include at least one primary cell. The multiple serving cells may include one or multiple secondary cells. The multiple serving cells may include one or multiple Licensed Assisted Access (LAA) cells. The LAA cell is also referred to as an LAA secondary cell.

The primary cell is a serving cell in which an initial connection establishment procedure has been performed, a serving cell in which a connection re-establishment procedure has been started, or a cell indicated as a primary cell during a handover procedure. At a point in time when a Radio Resource Control (RRC) connection is established, or later, the secondary cell and/or the LAA cell may be configured.

The primary cell may be included in a licensed band. The LAA cell may be included in an unlicensed band. The secondary cell may be included in any one of the licensed band and the unlicensed band.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component careers). A single physical channel is transmitted in a single serving cell (component carrier) of the multiple serving cells (component carriers).

Physical channels and physical signals according to the present embodiment be described.

In FIG. 1, the following uplink physical channels are used for uplink radio communication from the terminal apparatus 1 to the base station apparatus 3. The uplink physical channels are used for transmission of information output from higher layers.

Physical Uplink Control CHannel (PUCCH)
Physical Uplink Shared CHannel (PUSCH)
Physical Random Access CHannel (PRACH)

The PUCCH is used for transmission of Uplink Control information (UCI).

The PUSCH is used for transmission of uplink data (Transport block, UpLink-Shared CHannel (UL-SCH)). In addition, the PUSCH may be used to transmit Uplink Control Information together with the uplink data.

The PRACH is used to transmit a random access preamble.

In FIG. 1, the following uplink physical signal is used in the uplink radio communication. The uplink physical signal is not used for transmission of information output from the higher layer, but is used by a physical layer.

Uplink Reference Signal (UL RS)

In the present embodiment, the following two types of uplink reference signals are used.

DeModulation Reference Signal (DMRS)
Sounding Reference Signal/Sounding Reference Symbol (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH.

The SRS is not associated with the transmission of the PUSCH or the PUCCH. The base station apparatus 3 may use the SRS for measuring a channel state.

In FIG. 1, the following downlink physical channels are used for downlink radio communication from the base station apparatus 3 to the terminal apparatus 1. The downlink physical channels are used for transmission of information output from higher layers.

Physical Downlink Control CHannel (PDCCH)
Physical Downlink Shared CHannel (PDSCH)

The PDCCH is used for transmission of Downlink Control Information (DCI). The Downlink Control Information is also referred to as a DCI format. The Downlink Control Information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within a subframe same as the subframe in which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted. The uplink grant includes a TPC command for the PUSCH.

The PDSCH is used for transmission of downlink data (transport block, DownLink Shared CHannel (DL-SCH)).

The UL-SCH, and the DL-SCH are transport channels. A channel to be used in a Medium Access Control (MAC) layer is referred to as a transport channel. A unit of the transport channel to be used in the MAC layer is also referred to as a Transport Block (TB) or a MAC Protocol Data Unit (PDU).

A configuration of the radio frame according to the present embodiment will be described below.

Figure 2:
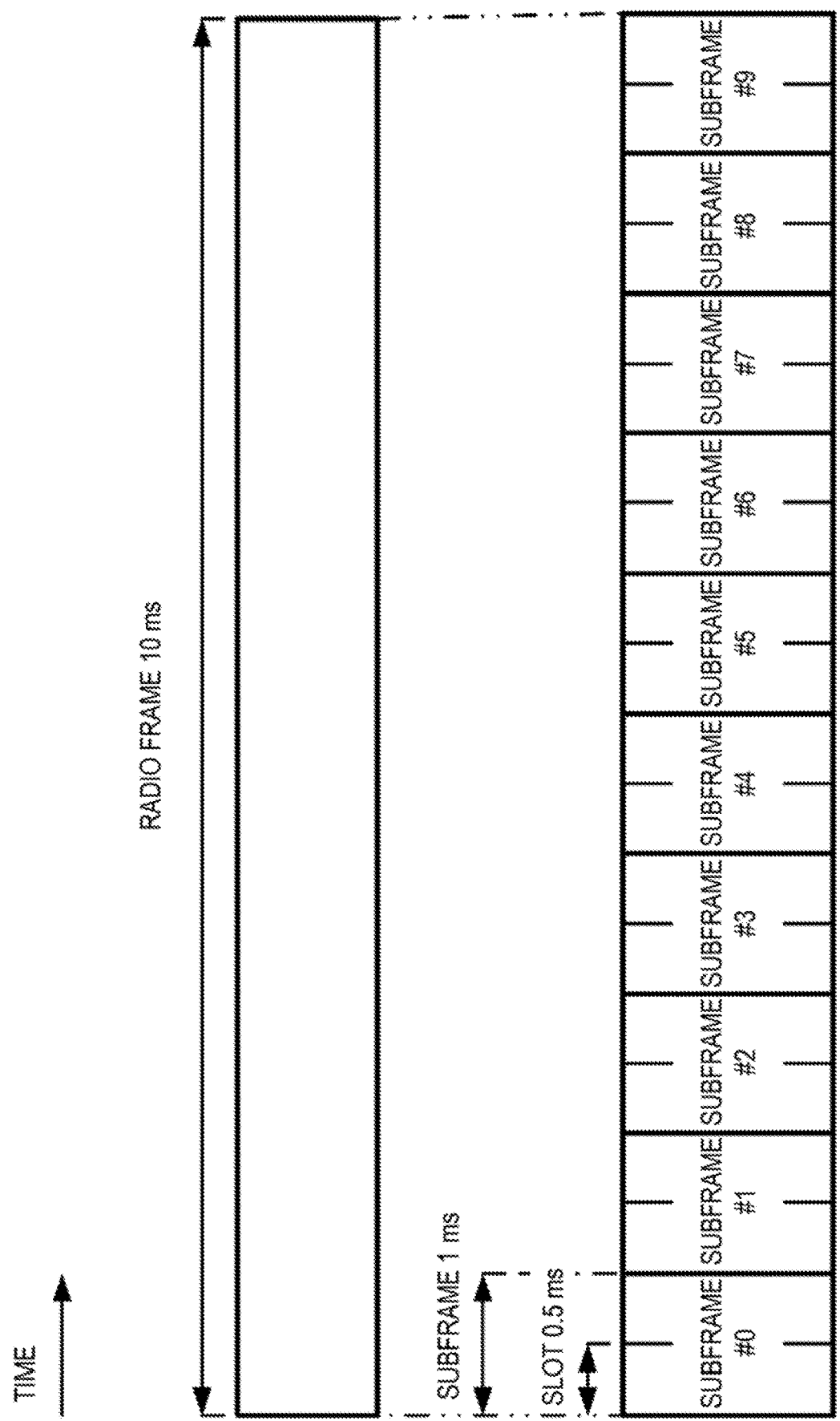
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames is 10 ms in length. Furthermore, each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

Hereinafter, a fair frequency sharing technique will be described.

A frequency to which an LAA cell corresponds may be commonly used by other communication systems and/or other LTE operators. In this case, in a communication method to be used by the LAA cell, the fair frequency sharing technique may be used.

The fair frequency sharing technique may include Listen-Before-Talk (LBT). Before a radio transmission and/or reception device (the base station apparatus 3 or the terminal apparatus 1) transmits a physical channel and a physical signal by using a serving cell (component carrier, channel, medium, frequency), interference power (interference signal, reception power, reception signal, noise power, noise signal) and the like in the above serving cell are measured (detected). Based on the above measurement (detection), whether the above serving cell is in an idle state or in a busy state is identified (detected, expected, determined). In a case that the radio transmission and/or reception device identifies the above serving cell is in the idle state based on the above measurement (detection), the radio transmission and/or reception device can transmit a physical channel and a physical signal in the above serving cell. In a case that the radio transmission and/or reception device identifies the above serving cell is in the busy state based on the above measurement (detection), the radio transmission and/or reception device does not transmit a physical channel and a physical signal in the above serving cell. Note that the LBT to be performed by the base station apparatus 3 before downlink transmission may be referred to as downlink LBT and the LBT to be performed by the terminal apparatus 1 before uplink transmission may be referred to as uplink LBT.

An LBT procedure is defined as a mechanism in which the radio transmission and/or reception device applies a Clear Channel Assessment (CCA) check before transmission in a serving cell. The radio transmission and/or reception device, in order to identify whether a serving cell is in the idle state or in the busy state, performs power detection or signal detection for determining presence or absence of another signal in the above serving cell. In the present embodiment, a definition of the CCA may be equivalent to a definition of the LBT. Note that, in the present embodiment, the CCA is also referred to as carrier sense.

The CCA can use various methods as a method for determining the presence or absence of another signal. For example, the presence or absence of another signal may be determined based on whether the interference power in the serving cell exceeds a threshold level or not. For example, the presence or absence of another signal may be determined based on whether the reception power of a prescribed signal or channel in the serving cell exceeds a threshold level or not. The above threshold level may be defined in advance. The above threshold level may be configured based on information/a signal received from other radio transmission and/or reception devices. The above threshold level may be determined (configured) based on at least another value (parameter) such as transmit power (maximum transmit power).

The CCA includes Initial CCA (ICCA, single sensing, LBT category 2, Frame-Based Equipment (FBE)), and Extended CCA (ECCA, multiple sensing, LBT category 3/4, Load-Based Equipment (LBE)). A period in which the CCA check is performed is referred to as a CCA period.

In a case of the ICCA, after the CCA check is once performed, a physical channel and a physical signal can be transmitted. A period in which a CCA check associated with the ICCA is performed is referred to as an ICCA period or an ICCA slot length. For example, the ICCA period is 25 microseconds.

In a case of the ECCA, after a prescribed number of the CCA checks are performed, a physical channel and a physical signal can be transmitted. A period in which a CCA check associated with the ECCA is performed is referred to as an ECCA period or an ECCA slot length. For example, the ECCA period is 9 microseconds. Note that the above prescribed number is also referred to as a backoff counter (counter, random number counter, ECCA counter). Furthermore, a period in which the CCA check is performed after the serving cell changes from the busy state to the idle state is referred to as a defer period or an ECCA defer period. For example, the defer period is 34 microseconds.

An example of the LBT (LBT category 4, LBE) procedure will be described. The radio transmission and/or reception device, in a case that information (data, buffer, load, traffic) that needs to be transmitted is generated in the idle state of waiting for transmission, determines whether the transmission is needed or not and proceeds to initial CCA. In the initial CCA, the CCA check is performed during an initial CCA period to sense the idle state or the busy state. In a case of determining the idle state as a result of the initial CCA, the radio transmission and/or reception device acquires a right to access and proceeds to a transmission operation. Then, whether to actually transmit at that timing or not is determined, and in a case of being determined to transmit, transmission is performed. After the transmission, whether any information that needs another transmission is still present (remains) or not is determined. In a case that information that needs another transmission is not present yet (does not remain), the radio transmission and/or reception device returns to the idle state. On the other hand, in a case of determining the busy state as a result of the initial CCA or in a case that the determination of whether any information that needs another transmission is still present (remains) or not results in determination that information that needs another transmission is still present (remains) after transmission, the radio transmission and/or reception device proceeds to the ECCA.

In the ECCA, first, a counter value N within a range from 0 to q−1 is randomly generated. The radio transmission and/or reception device then senses whether an ECCA defer period is idle or busy. In a case of determining that the ECCA defer period is busy, the radio transmission and/or reception device senses again whether the channel is idle or busy in the ECCA defer period. On the other hand, in a case of determining that the ECCA defer period is idle, then the radio transmission and/or reception device senses the channel (medium) during one ECCA slot duration to determine whether the above channel is idle or busy. In a case of being determined the above channel is idle, the counter value N is decremented by 1. The radio transmission and/or reception device returns to the process of sensing the channel in the ECCA defer period again in a case of determining that the above channel is busy. The radio transmission and/or reception device determines whether the counter value is 0 or not. In a case that the counter value is 0, the radio transmission and/or reception device proceeds to a transmission process. On the other hand, in a case that the counter value is not 0, the radio transmission and/or reception device senses the channel (medium) during one ECCA slot duration again. Note that a value of a contention window q in a case that the counter value N is generated is updated to a value between X and Y according to a channel state.

For example, the value of the contention window q is determined based on a power value, a measurement result, and the like that are obtained by channel sensing of the radio transmission and/or reception device. A minimum value X and a maximum value Y that are used to determine the value of the contention window q may be parameters configured by a higher layer.

In the LBT procedure, the ECCA may not necessarily be performed. Specifically, in a case of determining that the channel is busy as a result of the ICCA, the radio transmission and/or reception device may return to the idle state instead of proceeding to the ECCA process. Furthermore, even in a case that, after the transmission, information that needs another transmission is still present, the radio transmission and/or reception device may return to the idle state instead of proceeding to the ECCA process. LBT involving such a process is also referred to as an LBT category 2.

Hereinafter, a configuration of transmit power $P_{PRACH}$ for MACH (random access preamble) transmission will be described.

The transmit power $P_{PRACH}$ for PRACH (random access preamble) transmission is configured based on at least a state variable PREAMBLE_TRANSMISSION_COUNTER. The transmit power $P_{PRACH}$ for PRACH (random access preamble) transmission is ramped up based on a state variable PREAMBLE_TRANSMISSION_COUNTER. The state variable PREAMBLE_TRANSMISSION_COUNTER is also referred to as the transmission counter. The transmit power $P_{PRACH}$ is given by Equation (1) and Equation (2).

$$P_{PRACH}=\min\{P_{CMAX,c}(i), \text{PREAMBLE\_RECEIVED\_TARGET\_POWER}+PL_c\}[\text{dBm}] \quad \text{[Equation 1]}$$

where $P_{CMAX,c}(i)$ is the configured UE transmit power for subframe i of serving cell c; and $PL_c$ is the downlink path loss estimate calculated in the UE for serving cell c.

PREAMBLE_RECEIVED_TARGET_POWER= preambleInitialReceivedTargetPower+DELTA_PREAMBLE+(PREAMBLE_TRANSMISSION_COUNTER−1)*powerRampingStep  [Equation 2]

where preambleInitialReceivedTargetPower and powerRampingStep are provided by the higher layer (RRC layer); and DELTA_PREAMBLE is the random access preamble format based power offset value.

min{ } is a function that outputs a minimum value from multiple input values. $P_{CMAX,c}(i)$ is a maximum transmit power value for a subframe i in a serving cell c. The above maximum transmit power value is also referred to as UE transmit power to be configured. $PC_c$ is downlink path loss estimation, for the serving cell c. The downlink path loss estimation is calculated by the terminal apparatus 1.

DELTA_PREAMBLE is a power offset value based on a random access preamble format. preambleInitialReceivedTargetPower and powerRampingStep are parameters of a higher layer (RRC layer). The base station apparatus 3 may transmit information indicating a parameter of the above higher layer (RRC layer), to the terminal apparatus 1. preambleInitialReceivedTargetPower indicates initial transmit power for PRACH (random access preamble) transmission. powerRampingStep indicates a step for transmit power to be ramped up based on the transmission counter PREAMBLE_TRANSMISSION_COUNTER. That is, the transmission counter corresponds to the number of times of the transmit power ramped up. Furthermore, by setting the transmission counter to 1, ramp-up of the transmit power is reset. Furthermore, by incrementing the transmission counter by 1, the ramp-up of the transmit power is applied once.

An overview of a non-contention based random access procedure will be described below.

Figure 3:
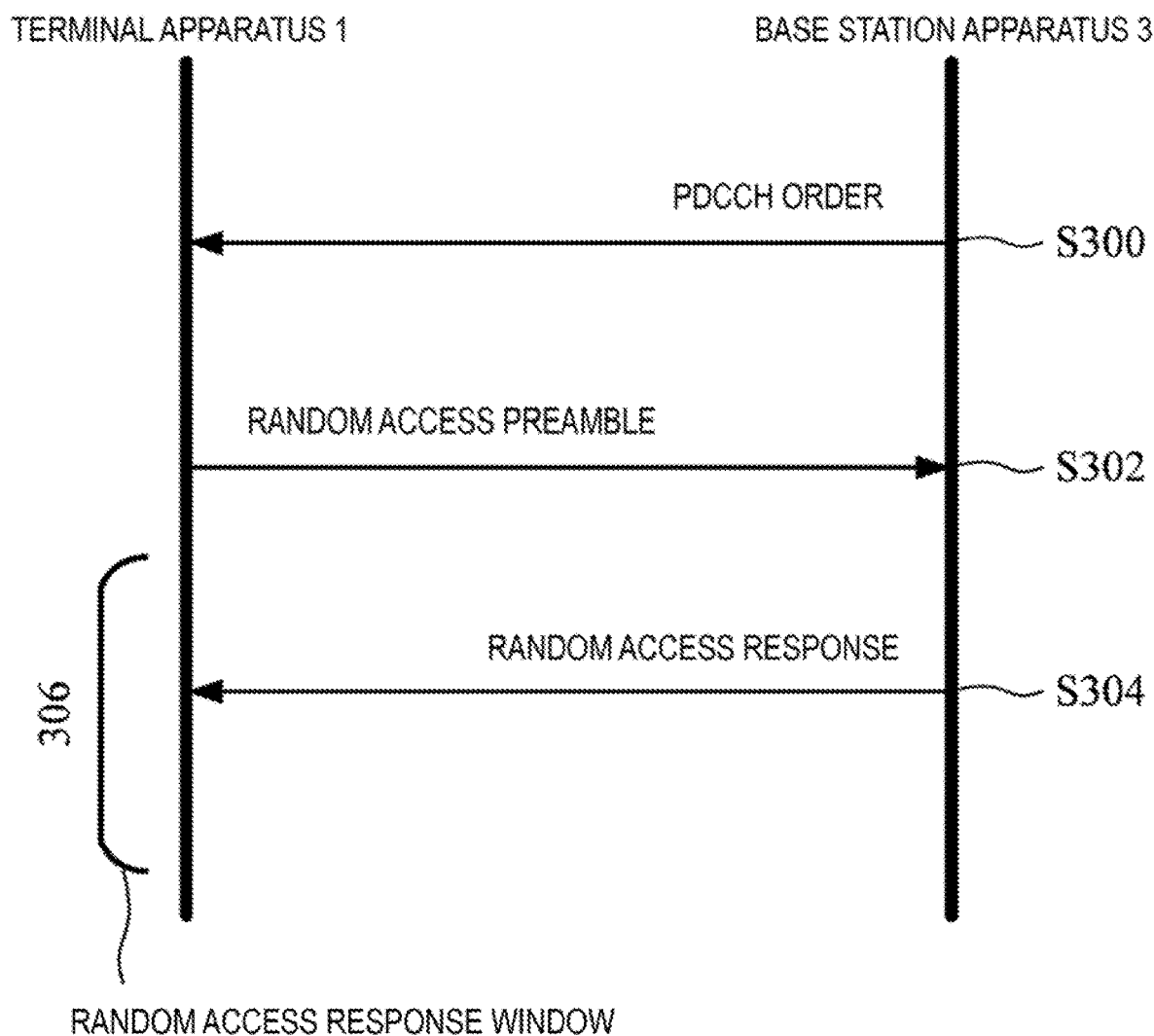
FIG. 3 is a diagram illustrating an example of a non-contention based random access procedure according to the present embodiment.

FIG. 3 is a diagram illustrating an example of the non-contention based random access procedure according to the present embodiment. The non-contention based random access procedure is started by a PDCCH order. In S300, the base station apparatus 3 uses a PDCCH to transmit a PDCCH order to the terminal apparatus 1. In S302, the terminal apparatus 1 uses a PRACH to transmit a random access preamble. In S304, the base station apparatus 3 transmits a random access response corresponding to the random access preamble transmitted in S302. In a case that the random access response corresponding to the random access preamble transmitted in S302 is received, the terminal apparatus 1 regards reception of the random access response succeeds, and regards the random access procedure completes successfully.

The random access response corresponding to the random access preamble includes a Random Access Preamble IDentifier (RAPID) specifying the random access preamble transmitted in S302. That is, in a case that the random access response includes the RAPID corresponding to the random access preamble transmitted in S302, the terminal apparatus 1 regards reception of the random access response succeeds, and regards the random access procedure completes successfully.

The PDCCH order is also referred to as a random access message 0. The random access preamble is also referred to as a random access message 1. The random access response is also referred to as a random access message 2.

A DCI format 1A is used for a random access procedure to be started by a PDCCH order. The following information may be transmitted by using the DCI format 1A. That is, the PDCCH order may indicate part or all of the following information.

Preamble Index

PRACH Mask Index

The terminal apparatus 1, based on the above Preamble Index, may select an index of the random access preamble to be transmitted in S302. The terminal apparatus 1, based on the above PRACH Mask Index, may select a PRACH resource to be used for transmitting the random access preamble in S302.

The terminal apparatus 1, during a random access response window 306, monitors a PDCCH including RA-RNTI. The above RA-RNTI may be given, based on the PRACH resource used for transmitting the random access preamble in S302. The PDCCH including the above RA-RNTI includes a downlink grant to be used for scheduling a PDSCH including a random access response.

The non-contention based random access procedure according to the present embodiment includes a non-contention based random access procedure type 1 and a non-contention based random access procedure type 2. The non-contention based random access procedure type 1 is referred to as an RAP type 1. The non-contention based random access procedure type 2 is referred to as an RAP type 2. In the RAP type 1, LBT/CCA is not performed immediately before PRACH transmission. In the RAP type 2, LBT/CCA is performed immediately before PRACH transmission. A management method of a transmission counter in the RAP type 1 is different from a management method of a transmission counter in the RAP type 2.

In the RAP type 1, in a case that a random access response is not received in a random access response window, or in a case that all random access responses received in a random access response window do not include a RAPID corresponding to a transmitted random access preamble, the random access preamble is automatically re-transmitted.

In the RAP type 2, in a case that transmission of a random access preamble is stopped by determining an LBT/CCA period is busy, the random access preamble is automatically re-transmitted. In the RAP type 2, in a case that a random access response is not received in a random access response window, or in a case that all random access responses received in a random access response window do not include a RAPID corresponding to a transmitted random access preamble, the random access preamble is not automatically re-transmitted.

In a primary cell and a secondary cell, the RAP type 1 may be supported and the RAP type 2 may not necessarily be supported. In an LAA cell, the RAP type 1 may not necessarily be supported and the RAP type 2 may be supported.

In each of the secondary cell and the LAA cell, both the RAP type 1 and the RAP type 2 may be supported. In each of the secondary cell and the LAA cell, the base station apparatus 3 may control which of the RAP type 1 and the RAP type 2 is applied, using higher layer signaling (an RRC parameter). The terminal apparatus 1, in each of the secondary cell and the LAA cell, based on the higher layer signaling (RRC parameter) received from the base station apparatus 3, may control which of the RAP type 1 and the RAP type 2 is applied.

Hereinafter, an example of the RAP type 1 will be described.

Figure 4:
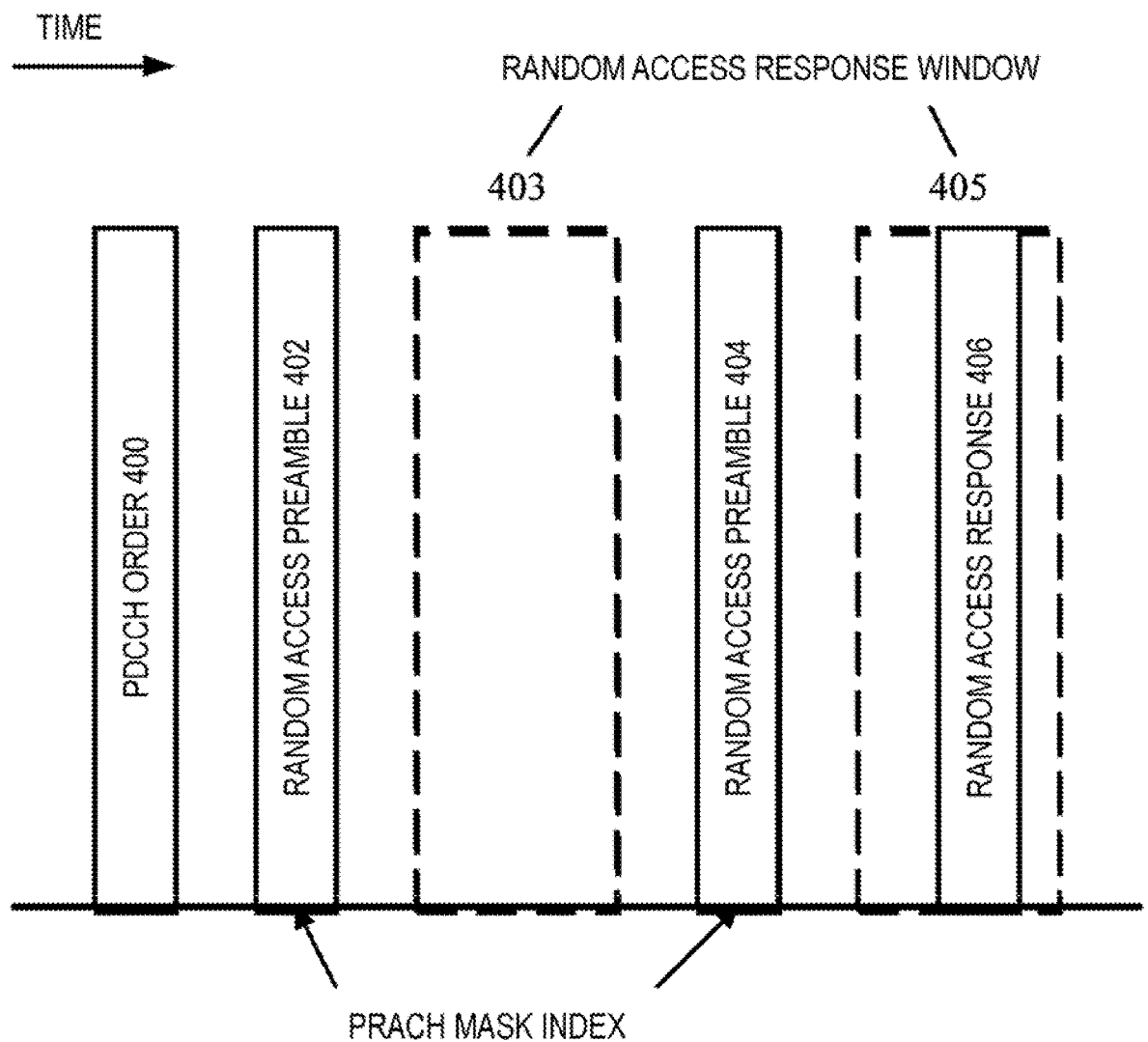
FIG. 4 is a diagram illustrating an example of an RAP type 1 according to the present embodiment.

FIG. 4 is a diagram illustrating an example of the RAP type 1 according to the present embodiment. A PDCCH order 400 starts the RAP type 1. At the start of the RAP type 1, a transmission counter is set to 1.

The terminal apparatus 1, at least based on a PRACH Mask Index included in the PDCCH order 400, determines a PRACH resource to be used for transmitting a random access preamble 402. In a case that a random access response is not received in a random access response window 403, or in a case that all random access responses received in the random access response window 403 do not include a RAPID corresponding to a random access preamble 402, the transmission counter is incremented by 1, and a PRACH resource 404 is selected. That is, in the RAP type 1, in the case that a random access response is not received in a random access response window 403, or in the case that all random access responses received in the random access response window 403 do not include a RAPID corresponding to the random access preamble 402, the terminal apparatus 1 automatically resumes the transmission of the random access preamble. That is, in the RAP type 1, based on one reception of the PDCCH order, the PRACH (random access preamble) may be transmitted multiple times.

Here, after incrementing the transmission counter, in a case that a value of the transmission counter is the same as a prescribed value, the terminal apparatus 1 regards that the RAP type 1 completes unsuccessfully, or indicates a random access problem to a higher layer (RRC layer) of the terminal apparatus 1. The above prescribed value may be given based on an RRC parameter received from the base station apparatus 3. The higher layer (RRC layer) of the terminal apparatus 1 may notify the higher layer (RRC layer) of the base station apparatus 3 of the occurrence of the random access problem.

The terminal apparatus 1, at least based on the PRACH Mask Index included in the PDCCH order 400, determines a PRACH resource used for transmitting a random access preamble 404. In a case that a random access response 406 corresponding to the random access preamble 404 is received in a random access response window 405, reception of the random access response 406 is regarded as success, and the RAP type 1 is regarded to complete successfully.

Hereinafter, an example of the RAP type 2 will be described.

Figure 5:
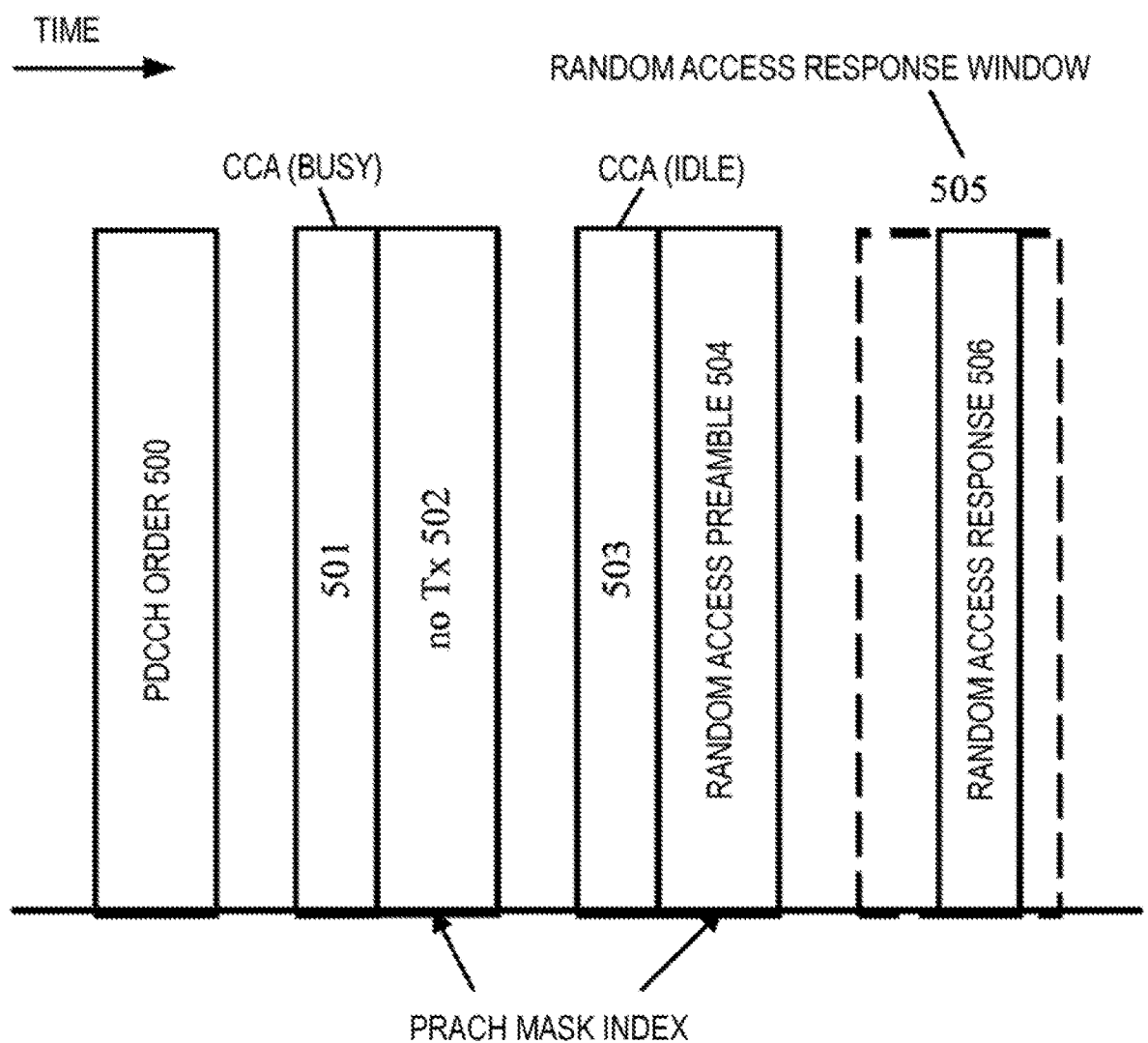
FIG. 5 is a diagram illustrating an example of an RAP type 2 according to the present embodiment.

FIG. 5 is a diagram illustrating an example of the RAP type 2 according to the present embodiment. A PDCCH order 500 starts the RAP type 2.

The terminal apparatus 1, at least based on a PRACH Mask Index included in the PDCCH order 500, determines periods 501/503 for LBT/CCA, and PRACH resources 502/504 to be used for transmitting a random access preamble. In a case that the terminal apparatus 1 determines the period 501 is busy, the terminal apparatus 1 does not use the PRACH resource 502 to transmit a random access preamble and performs the LBT/CCA in the period 503. In a case that the terminal apparatus 1 determines the period 503 is idle, the terminal apparatus 1 uses the PRACH resource 504 to transmit the random access preamble 504.

In a case that a random access response 506 corresponding to the random access preamble 504 is received in a random access response window 505, reception of the random access response 506 is regarded as success, and the RAP type 2 is regarded to complete successfully.

In a case that a random access response is not received in the random access response window 505, or in a case that all random access responses received in the random access response window 505 do not include a RAPID corresponding to the random access preamble 504, the terminal apparatus 1, regardless of the value of the transmission counter, regards the RAP type 2 completes unsuccessfully, or indicates a random access problem to a higher layer (RRC layer) of the terminal apparatus 1. That is, in the RAP type 2, in the case that a random access response is not received in the random access response window 505, or in the case that all random access responses received in the random access response window 505 do not include a RAPID corresponding to the random access preamble 504, the terminal apparatus 1 does not automatically resume transmission of the random access preamble. That is, in the RAP type 2, based on one reception of a PDCCH order, a PRACH (random access preamble) is transmitted once.

In a case that a random access preamble is not transmitted in all PRACH resources corresponding to the PRACH Mask Index included in the PDCCH order 500, the terminal apparatus 1 may regard the RAP type 2 completes unsuccessfully, or may indicate a random access problem to the higher layer (RRC layer) of the terminal apparatus 1.

In the case that the random access preamble is not transmitted in all PRACH resources corresponding to the PRACH Mask Index included in the PDCCH order 500, and in the case that a random access response is not received in the random access response window 505, the terminal apparatus 1 may regard the RAP type 2 completes unsuccessfully, or may indicate a random access problem to the higher layer (RRC layer) of the terminal apparatus 1.

In the RAP type 2, the base station apparatus 3 may use a PDCCH order (DCI format 1A) to control a transmission counter in the terminal apparatus 1. That is, the base station apparatus 3 may use the PDCCH order (DCI format 1A) to control transmit power $P_{PRACH}$ for PRACH (random access preamble) transmission.

In the RAP type 2, the terminal apparatus 1 may, based on the PDCCH order (DCI format 1A), control the transmission counter. That is, the terminal apparatus 1 may, based on the PDCCH order (DCI format 1A), control the transmit power $P_{PRACH}$ for PRACH (random access preamble) transmission.

For example, in a case that a preamble index included in the PDCCH order indicates a value other than a prescribed value, the transmission counter may be set to 1 at a start of the RAP type 2. For example, in a case that a preamble index included in the PDCCH order indicates a prescribed value, the transmission counter may be incremented by 1 at the start of the RAP type 2. Here, in a case that a random access preamble is not transmitted in all PRACH resources to which a PDCCH order Y received immediately before reception of a PDCCH order X corresponds, and even in a case that a preamble index included in the above PDCCH order X indicates a prescribed value, the transmission counter may not necessarily be incremented by 1. In this case, the value of the transmission counter is retained. Here, the above prescribed value may be '000000'. In a case that the preamble index included in the PDCCH order X indicates a prescribed value, the terminal apparatus 1, based on a preamble index included in the PDCCH order Y received immediately before reception of the PDCCH order X, may select a random access preamble.

That is, in a case that a random access preamble is transmitted in a PRACH resource to which the PDCCH order Y received immediately before reception of the PDCCH order X corresponds, and in a case that the preamble index included in the PDCCH order X indicates the prescribed value, the transmission counter may be incremented by 1.

That is, in a case that a random access preamble is not transmitted in all PRACH resources to which the PDCCH order Y received immediately before reception of the PDCCH order X corresponds, and in the case that the preamble index included in the PDCCH order X indicates the prescribed value, a counter of the transmission counter may be retained.

For example, in a case that a transmit power control command included in the PDCCH order indicates '0', the transmission counter may be set to 1 at the start of the RAP type 2. For example, in a case that a transmit power control command included in the PDCCH order indicates '1', the transmission counter may be incremented by 1 at the start of the RAP type 2. Here, in a case that the random access preamble is not transmitted in all PRACH resources to which the PDCCH order Y received immediately before reception of the PDCCH order X corresponds, and even in a case that the transmit power control command included in the above PDCCH order X indicates '1', the transmission counter may not necessarily be incremented by 1. In this case, the value of the transmission counter is retained.

That is, in the case that a random access preamble is transmitted in the PRACH resource to which the PDCCH order Y received immediately before reception of the PDCCH order X corresponds, and in the case that the transmit power control command included in the PDCCH order X indicates '1', the transmission counter may be incremented by 1.

That is, in the case that the random access preamble is not transmitted in all PRACH resources to which the PDCCH order Y received immediately before reception of the PDCCH order X corresponds, and in the case that the transmit power control command included in the PDCCH order X indicates '1', a value of the transmission counter may be retained.

That is, the terminal apparatus 1 may, based on whether a random access preamble is transmitted or not in any one of (i) information included in the PDCCH order and (ii) the PRACH resource to which the PDCCH order Y received immediately before reception of the PDCCH order X corresponds, perform one of the following process (1) to process (3).

(Process 1) Set the transmission counter to 1.
(Process 2) Increment the transmission counter by 1.
(Process 3) Retain the value of the transmission counter.

Structures of devices according to the present embodiment will be described below.

Figure 6:
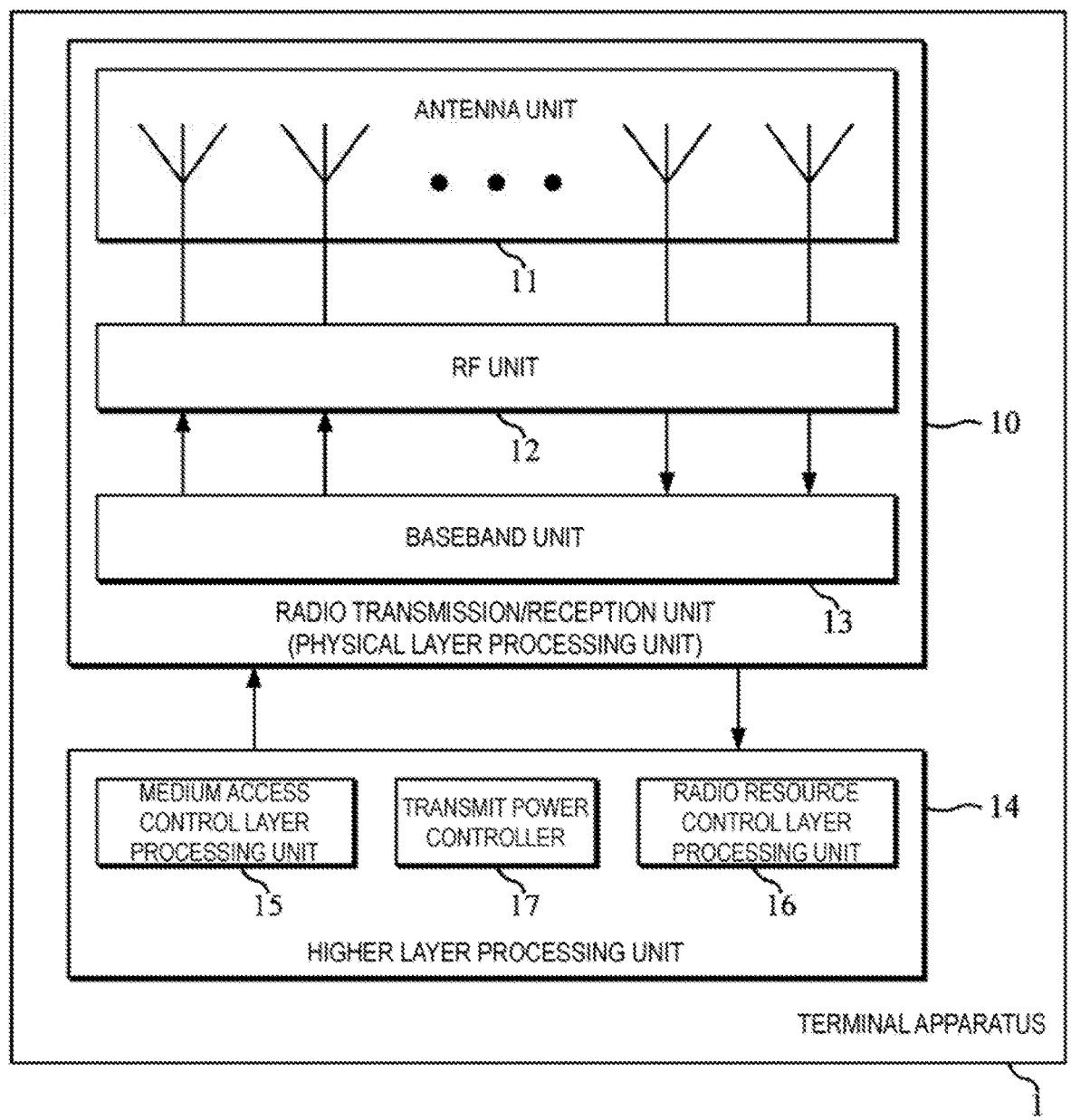
FIG. 6 is a schematic block diagram illustrating a configuration of a terminal apparatus 1 according to the present embodiment.

FIG. 6 is a schematic block diagram illustrating a configuration of the terminal apparatus 1 according to the present embodiment. As illustrated, the terminal apparatus 1 is constituted to include a radio transmission/reception unit 10 and a higher layer processing unit 14. The radio transmission/reception unit 10 is constituted to include an antenna unit 11, a Radio Frequency (RF) unit 12, and a baseband unit 13. The higher layer processing unit 14 is constituted to include a medium access control layer processing unit 15, a radio resource control layer processing unit 16 and a transmit power controller 17. The radio transmission/reception unit 10 is also referred to as a transmitter, a receiver or a physical layer processing unit.

The higher layer processing unit 14 outputs uplink data (transport block) generated by a user operation or the like, to the radio transmission/reception unit 10. The higher layer processing unit 14 performs processing of the Medium Access Control (MAC) layer, a Packet Data Convergence Protocol (PDCP) layer, a Radio Link Control (RLC) layer, and a Radio Resource Control (RRC) layer.

The medium access control layer processing unit 15 included in the higher layer processing unit 14 performs processing of the Medium Access Control layer. The medium access control layer processing unit 15 controls a random access procedure in accordance with the various pieces of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages the various types of configuration information/parameters of the terminal apparatus 1. The radio resource control layer processing unit 16 sets the various types of configuration information/parameters, based on higher layer signaling received from the base station apparatus 3. That is, the radio resource control layer processing unit 16 sets the various types of configuration information/parameters, based on information indicating various types of configuration information/parameters received from the base station apparatus 3.

The transmit power controller 17 included in the higher layer processing unit 14 configures transmit power for PRACH (random access preamble) transmission.

The radio transmission/reception unit 10 performs processing of the physical layer, such as modulation, demodulation, coding, and decoding. The radio transmission/reception unit 10 demultiplexes, demodulates, and decodes a signal received from the base station apparatus 3, and outputs the information resulting from the decoding to the higher layer processing unit 14. The radio transmission/reception unit 10 modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a transmit power controller.

Figure 7:
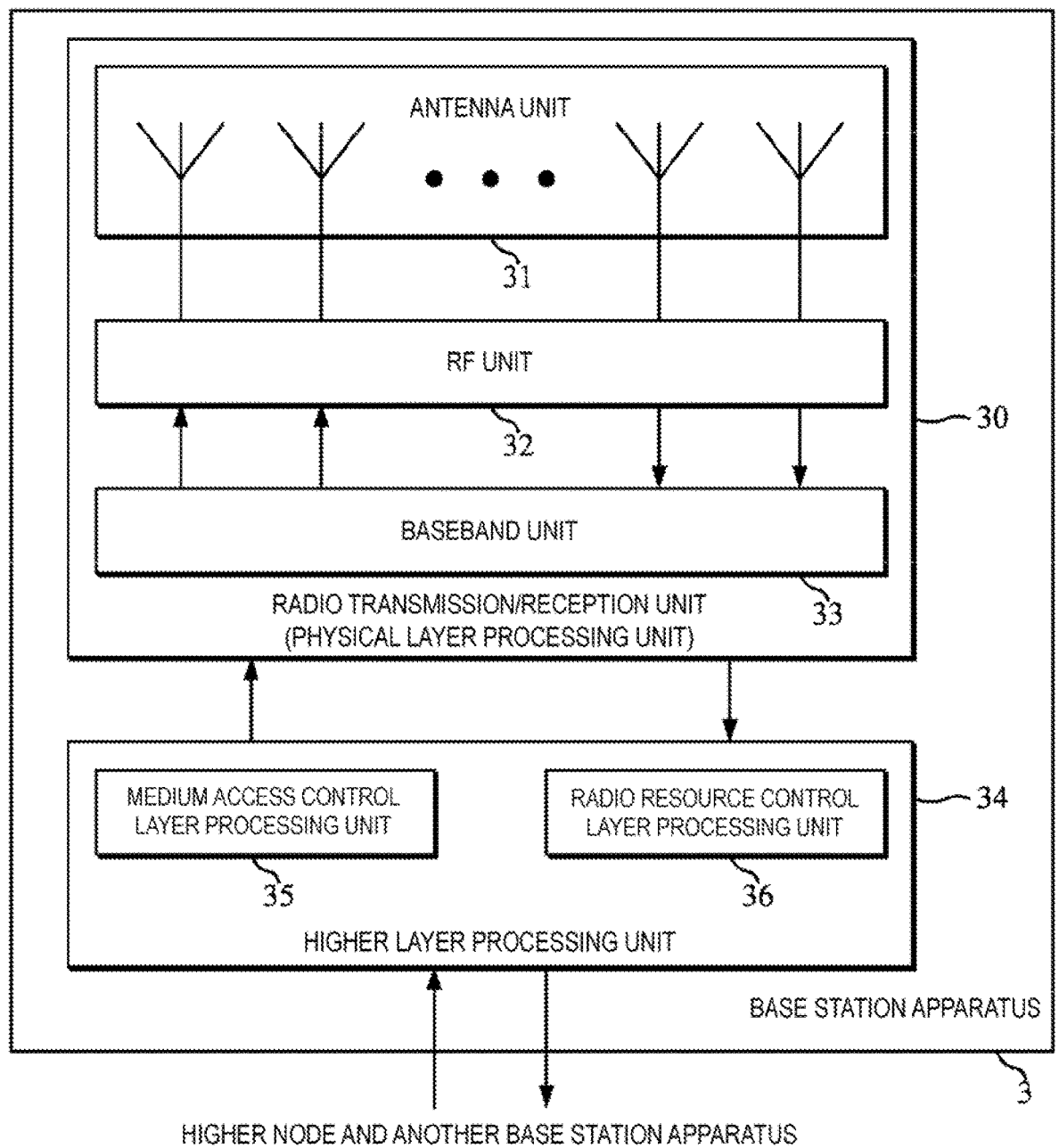
FIG. 7 is a schematic block diagram illustrating a configuration of a base station apparatus 3 according to the present embodiment.

FIG. 7 is a schematic block diagram illustrating a configuration of the base station apparatus 3 according to the present embodiment. As illustrated, the base station apparatus 3 is constituted to include a radio transmission/reception unit 30 and a higher layer processing unit 34. The radio transmission/reception unit 30 is constituted to include an antenna unit 31, an RF unit 32, and a baseband unit 33. The higher layer processing unit 34 is constituted to include a medium access control layer processing unit 35 and a radio resource control layer processing unit 36. The radio transmission/reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls a random access procedure in accordance with the various pieces of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission/reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signaling. In other words, the radio resource control layer processing unit 36 transmits/broadcasts information indicating various types of configuration information/parameters.

The functionality of the radio transmission/reception unit 30 is similar to that of the radio transmission/reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of the terminal apparatus 1 and the base station apparatus 3 according to the present embodiment will be described below.

(1) A first aspect of the present embodiment is a terminal apparatus 1 that includes a medium access control processing unit 15 configured to start a non-contention based random access procedure based on a PDCCH order, a transmit power controller 17 configured to configure transmit power for transmitting a random access preamble by using a PRACH, based on the PDCCH order, and a transmitter 10 configured to transmit the random access preamble by using the PRACH.

(2) In the first aspect of the present embodiment, the transmit power controller 17, based on whether a second random access preamble is transmitted or not in any one of (i) information included in the PDCCH order and (ii) multiple PRACH resources corresponding to information included in a second PDCCH order received immediately before the PDCCH order, configures the transmit power.

(3) In the first aspect of the present embodiment, the transmit power controller 17, based on a transmission counter, configures the transmit power, and in a case that information included in the PDCCH order indicates a first value, at a start of the non-contention based random access procedure, the transmission counter is set to 1.

(4) In the first aspect of the present embodiment, in a case that information included in the PDCCH order indicates a second value, at a start of the non-contention based random access procedure, the transmission counter is incremented by 1.

(5) In the first aspect of the present embodiment, in a case that information included in the PDCCH order indicates a second value, and a second random access preamble is transmitted in any one of multiple PRACH resources corresponding to information included in a second PDCCH order received immediately before the PDCCH order, at a start of the non-contention based random access procedure, the transmission counter is incremented by 1.

(6) In the first aspect of the present embodiment, in a case that information included in the PDCCH order indicates a second value, and a random access preamble is not transmitted in all multiple PRACH resources corresponding to information included in a second PDCCH order received immediately before the PDCCH order, at a start of the non-contention based random access procedure, the transmission counter is retained.

(7) A second aspect of the present embodiment is a base station apparatus 3 that includes a transmitter 10 configured to transmit a PDCCH order to be used to start a non-contention based random access procedure, and a receiver 10 configured to use a PRACH to receive a random access preamble, in which transmit power for transmitting the random access preamble by using the PRACH is controlled by using the PDCCH order.

(8) In the second aspect of the present embodiment, based on whether a second random access preamble is transmitted or not in any one of (i) information included in the PDCCH order and (ii) multiple PRACH resources corresponding to information included in a second PDCCH order transmitted immediately before the PDCCH order, the transmit power is configured.

(9) In the second aspect of the present embodiment, the transmit power is configured based on a transmission counter, and in a case that information included in the PDCCH order indicates a first value, at a start of the non-contention based random access procedure, the transmission counter is set to 1.

(10) In the second aspect of the present embodiment, in a case that information included in the PDCCH order indicates a second value, at a start of the non-contention based random access procedure, the transmission counter is incremented by 1.

(11) In the second aspect of the present embodiment, in a case that information included in the PDCCH order indicates a second value, and a second random access preamble is transmitted in any one of multiple PRACH resources corresponding to information included in a second PDCCH order transmitted immediately before the PDCCH order, at a start of the-non contention based random access procedure, the transmission counter is incremented by 1.

(12) In the second aspect of the present embodiment, in a case that information included in the PDCCH order indicates a second value, and a random access preamble is not transmitted in all multiple PRACH resources corresponding to information included in a second PDCCH order received immediately before the PDCCH order, at a start of the non-contention based random access procedure, the transmission counter is retained.

(13) A third aspect of the present embodiment is a terminal apparatus 1 configured to use a primary cell and a secondary cell to communicate with a base station apparatus 3, the terminal apparatus 1 including a medium access control layer processing unit 15 configured to increment a transmission counter by 1 in a case that a random access response for a primary cell is not received in a random access response window and increment the transmission counter by 1 based on information included in a PDCCH order for a secondary cell, and a transmit power controller 17 configured to configure transmit power for transmission of a random access preamble by using a PRACH in the primary cell or a PRACH in the secondary cell, based on the transmission counter.

(14) In the third aspect of the present embodiment, in a case that a non-contention based random access procedure is started in the primary cell by the PDCCH order, regardless of the information included in the PDCCH order, the transmission counter is set to 1, and in a case that a non-contention based random access procedure is started in the secondary cell by the PDCCH order, the transmission counter is set to 1 based on the information included in the PDCCH order.

(15) A fourth aspect of the present embodiment is a terminal apparatus 1 that includes a receiver 10 configured to receive higher layer signaling, and a medium access control layer processing unit 15 configured to control based on the higher layer signaling, in a case that a non-contention based random access procedure is started in a serving cell by the PDCCH order, whether (i) the transmission counter is set to 1 regardless of the information included in the PDCCH order, or (ii) the transmission counter is set to 1 based on the information included in the PDCCH order.

(16) A fifth aspect of the present embodiment is a base station apparatus 3 that includes a transmitter 10 configured to transmit a PDCCH order, and the transmitter 10 transmits higher layer signaling to control, in a case that a non-contention based random access procedure is started in a serving cell by the PDCCH order, whether (i) the transmission counter is set to 1 regardless of the information included in the PDCCH order, or (ii) the transmission counter is set to 1 based on the information included in the PDCCH order.

Accordingly, a terminal apparatus can perform a random access procedure efficiently. Further, a base station apparatus can perform a random access procedure efficiently.

A program running on each of the base station apparatus 3 and the terminal apparatus 1 according to an aspect of the present invention may serve as a program that controls a Central Processing Unit (CPU) and the like (a program for causing a computer to operate) in such a manner as to enable the functionalities according to the above-described embodiment of an aspect of the present invention. The information handled in these apparatuses is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to the above-described embodiment may be partially achieved by a computer. In this case, this configuration may be enabled by recording a program for enabling such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to enable some of the functions described above, and also may be configured to be capable of enabling the functions described above in combination with a program already recorded in the computer system.

Furthermore, the base station apparatus 3 according to the above-described embodiment is achieved as an aggregation (a device group) constituted of multiple devices. Each of the devices constituting such a device group may include some or all portions of each function or each functional block of the base station apparatus 3 according to the above-described embodiment. The device group may include a series of general functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be achieved as an LSI which is a typical integrated circuit or may be achieved as a chip set. Each of the functional blocks of the terminal apparatus 1 and the base station apparatus 3 may be individually achieved as a chip, or some or all of the functional blocks may be integrated into a chip. Furthermore, a circuit integration technique is not limited to the LSI, and may be achieved with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

CROSS-REFERENCE OF RELATED APPLICATION

This application claims the benefit of priority to JP 2016-084269 filed on Apr. 20, 2016, which is incorporated herein by reference in its entirety.

REFERENCE SIGNS LIST 1 (1A, 1B, 1C) Terminal apparatus
3 Base station apparatus
10 Radio transmission/reception unit
11 Antenna unit
12 RF unit
13 Baseband unit
14 Higher layer processing unit
15 Medium access control layer processing unit
16 Radio resource control layer processing unit
17 Transmit power controller
30 Radio transmission/reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus which communicates with a base station apparatus by using multiple serving cells including a primary cell and one or multiple secondary cells, comprising:
medium access control layer processing circuitry configured to initiate a random access procedure for a secondary cell based on a single reception of a Physical Downlink Control CHannel (PDCCH) order;
a transmitter configured to transmit a first random access preamble; and
a receiver configured to receive a random access response, wherein
the transmitter is further configured to transmit a second random access preamble after the transmitter transmits the first random access preamble,
the medium access control layer processing circuitry, in a case that (a) reception of the random access response is considered not successful and (b) the first random access preamble was transmitted on the secondary cell, determines whether to transmit the second random access preamble based on the single reception of the PDCCH order, based on a configuration of a higher layer, and
the transmitter resumes, based on a second PDCCH order, random access preamble transmission to transmit the second random access preamble, in a case that the medium access control layer processing circuitry determines, based on the configuration, that the transmitter does not transmit the second random access preamble based on the single reception.

2. The terminal apparatus according to claim 1, wherein in a case that (a) reception of the random access response is considered not successful and (b) the first random access preamble was transmitted on the primary cell, the medium access control layer processing circuitry determines that the transmitter transmits the second random access preamble based on the single reception of the PDCCH order.

3. The terminal apparatus according to claim 2, wherein the configuration of the higher layer is a higher layer configuration for the secondary cell which is one of respective higher layer configurations for the one or multiple secondary cells.

4. A communication method used for a terminal apparatus which communicates with a base station apparatus by using multiple serving cells including a primary cell and one or multiple secondary cells, comprising the steps of:
initiating a random access procedure for a secondary cell based on a single reception of a Physical Downlink Control CHannel (PDCCH) order;
transmitting a first random access preamble;
determining, based on a configuration of a higher layer, whether to transmit a second random access preamble based on the single reception of the PDCCH order, in a case that (a) reception of a random access response is considered not successful and (b) the first random access preamble was transmitted on the secondary cell; and
transmitting the second random access preamble after transmitting the first random access preamble, wherein the second random access preamble is transmitted based on a second PDCCH order used to resume random access preamble transmission, in a case that the terminal apparatus determines, based on the configuration, that terminal apparatus does not transmit the second random access preamble based on the single reception.

5. The communication method according to claim 4, further comprising the step of:

determining that the terminal apparatus transmits the second random access preamble based on the single reception of the PDCCH order, in a case that (a) reception of the random access response is considered not successful and (b) the first random access preamble was transmitted on the primary cell.

6. The communication method according to claim 5, wherein the configuration of the higher layer is a higher layer configuration for the secondary cell which is one of respective higher layer configurations for the one or multiple secondary cells.

7. A base station apparatus which communicates with a terminal apparatus by using multiple serving cells including a primary cell and one or multiple secondary cells, comprising:

a transmitter configured to transmit, to the terminal apparatus, a Physical Downlink Control CHannel (PDCCH) order, wherein the PDCCH order causes the terminal apparatus to initiate a random access procedure for a secondary cell based on a single reception of the PDCCH order; and a receiver configured to receive, from the terminal apparatus, a first random access preamble, wherein the transmitter is further configured to transmit a random access response to the terminal apparatus, the transmitter is further configured to transmit, to the terminal apparatus, a configuration of a higher layer, wherein the configuration causes the terminal apparatus to determine, based on the configuration, whether to transmit a second random access preamble based on the single reception of the PDCCH order in a case that (a) reception of the random access response is considered not successful and (b) the terminal apparatus has transmitted the first random access preamble on the secondary cell, the transmitter is further configured to transmit a second PDCCH order to the terminal apparatus, wherein, in a case that the terminal apparatus determines, based on the configuration, that terminal apparatus does not transmit the second random access preamble based on the single reception, the second PDDCH order is used to cause the terminal apparatus to resume random access preamble transmission to transmit the second random access preamble, and the receiver is further configured to receive the second random access preamble after receiving the first random access preamble.

8. A communication method used for a base station apparatus which communicates with a terminal apparatus by using multiple serving cells including a primary cell and one or multiple secondary cells, comprising the steps of:

transmitting, to the terminal apparatus, a Physical Downlink Control CHannel (PDCCH) order, wherein the PDCCH order causes the terminal apparatus to initiate a random access procedure for a secondary cell based on a single reception of the PDCCH order;

receiving, from the terminal apparatus, a first random access preamble;

transmitting a random access response to the terminal apparatus;

transmitting, to the terminal apparatus, a configuration of a higher layer, wherein the configuration causes the terminal apparatus to determine, based on the configuration, whether to transmit a second random access preamble based on the single reception of the PDCCH order in a case that (a) reception of the random access response is considered not successful and (b) the terminal apparatus has transmitted the first random access preamble on the secondary cell;

transmitting a second PDCCH order to the terminal apparatus, wherein, in a case that the terminal apparatus determines, based on the configuration, that terminal apparatus does not transmit the second random access preamble based on the single reception, the second PDDCH order is used to cause the terminal apparatus to resume random access preamble transmission to transmit the second random access preamble; and receiving the second random access preamble after receiving the first random access preamble.

* * * * *